United States Patent [19]
Boyack et al.

[11] Patent Number: 5,724,456
[45] Date of Patent: Mar. 3, 1998

[54] BRIGHTNESS ADJUSTMENT OF IMAGES USING DIGITAL SCENE ANALYSIS

[75] Inventors: James R. Boyack, Waltham; Andrew K. Juenger, Hudson, both of Mass.

[73] Assignee: Polaroid Corporation, Cambridge, Mass.

[21] Appl. No.: 414,750

[22] Filed: Mar. 31, 1995

[51] Int. Cl.⁶ .................................................. G06T 5/40
[52] U.S. Cl. ...................... 382/274; 382/173; 382/169; 348/672; 395/128; 345/155
[58] Field of Search .................... 382/254, 274, 382/168, 169, 173, 239, 232, 167, 171, 172, 308; 348/672, 251, 254, 255, 256, 688; 396/233, 234; 395/126, 128; 345/147, 155, 214

[56] References Cited

U.S. PATENT DOCUMENTS

| | | | |
|---|---|---|---|
| 4,214,826 | 7/1980 | Uchida et al. | 396/234 |
| 4,394,078 | 7/1983 | Terashita | 396/234 |
| 4,445,138 | 4/1984 | Zwirn et al. | 348/672 |
| 4,639,769 | 1/1987 | Fleisher et al. | 348/672 |
| 4,868,651 | 9/1989 | Chou et al. | 378/98.7 |
| 4,929,824 | 5/1990 | Miyazaki | 364/525 |
| 5,042,077 | 8/1991 | Burke | 382/169 |
| 5,150,433 | 9/1992 | Daly | 382/250 |
| 5,418,895 | 5/1995 | Lee | 395/131 |

FOREIGN PATENT DOCUMENTS 296608  12/1988  European Pat. Off.  ........ H04N 7/133

OTHER PUBLICATIONS

"A New Algorithm For Exposure Control Based On Fuzzy Logic For Video Cameras" by Shimizu et al., IEEE Transactions on Consumer Electronics, vol. 38, No. 3, Aug. 1992.

*Primary Examiner*—Leo Boudreau
*Assistant Examiner*—Brian P. Werner
*Attorney, Agent, or Firm*—Robert A. Sabourin

[57] ABSTRACT

A system and method for processing a digital image signal which represents an image can be made to optimally map luminance values versus a tonal reproduction capability of a destination application. Specifically, the system includes a device for partitioning the image into blocks, then combining certain blocks into sectors. An average luminance block value is determined for each block and a difference is determined between the maximum and minimum average luminance block values for each sector. If the difference exceeds a predetermined threshold value, then the sector is labeled as an active sector and an average luminance sector value is obtained from maximum and minimum average luminance block values. All weighted counts of active sectors of the image are plotted versus the average luminance sector values in a histogram, then the histogram is shifted via some predetermined criterion so that the average luminance sector values of interest will fall within a destination window corresponding to the tonal reproduction capability of a destination application.

16 Claims, 4 Drawing Sheets

BRIGHTNESS ADJUSTMENT OF IMAGES USING DIGITAL SCENE ANALYSIS

BACKGROUND OF THE INVENTION

1. Field of the Invention

The invention relates generally to an improved image processing system and methods for use with this system. More particularly, the invention relates to a system and methods thereto for adjusting the lightness of a digitally represented image.

2. Description of the Prior Art

Anyone acquiring an image needs to have a permanent record which faithfully reproduces the original subject or scene, or at least those aspects of the subject or scene which are considered most important. The quality of the reproduction is judged by visually comparing the hardcopy with the original scene where the hardcopy is nearly immediately available or with what is remembered about the scene. In making this judgment an observer compares the magnitude of the visual sensation created by the hardcopy under the prevailing viewing conditions with the magnitude of the visual sensation created by the original scene under the actual lighting conditions or what they are remembered to be, i.e., the observer compares the brightness of various points in the hardcopy with the brightness of corresponding points in the original scene and thereby forms a subjective opinion about the quality of the reproduction. Exact subjective tone reproduction requires that the brightness of each point in the hardcopy equals that of the brightness of a corresponding point in the original scene. However, as those skilled in the arts know, exact subjective tone reproduction is extraordinarily difficult and inconvenient to achieve because hardcopy media are generally viewed at illumination levels which are significantly less than those under which an original was created—original photographs typically being about 1/100 that of the original scene. This fact and the fact that most hardcopy media, as their tone scale characteristics indicate, have a limited ability to capture the range of tones which typically exist in nature would seem to indicate that an observer could never be satisfied with the rendition that can be produced with the present level of reproduction technology. However, this is obviously not the case, and the reason for it is that satisfactory subjective tone reproduction can be obtained and will please an observer if the brightnesses of the subject under ordinary viewing conditions are approximately proportional to corresponding scene brightnesses, if the brightness of skin tones approximately equals that of real skin under the prevailing viewing conditions, if the apparent hue and saturation of object colors is maintained relative to the original scene, and if the medium reproduces tones corresponding more or less to the range of tones represented by the important objects of the scene.

To assure that the foregoing conditions are more or less satisfied depends, ultimately, on properly matching the scene lightness values to the tone scale of the medium, taking into account the particular scene characteristics, prevailing scene lighting conditions, and the medium characteristics. Given the variety of possible scenes and lighting conditions, proper matching can only be achieved regularly by understanding the complex interrelationships of the entire reproduction system and some probability estimate of the likelihood of the occurrence of typical scenes. This would include knowing, for example, the most likely distribution and intensities of scene illuminance patterns expected to be captured, the spectral reflectivity of commonly recurring objects expected to be reproduced, the spectral content of likely scene illuminance, and the spectral response and tone scale characteristics of the medium. In currently available amateur camera products, all of these interrelationships are typically automatically correlated for optimum exposure by a camera's automatic exposure control system which commonly utilizes a built-in "averaging" or "center-weighted" type meter for exposure prediction purposes. Further, in electronic imaging, images are acquired and represented as digital signals which can be manipulated, processed or displayed through the use of computers or other special purpose electronic hardware. The processing of these digital signals includes known techniques such as luminance averaging or center-weighting for automatic exposure control.

While the various known tone matching techniques may prove adequate for many purposes, they apparently do not consider tone as a function of the detail that may be present in the subject. Consequently, the primary object of the present invention is to provide an improved system, and associated methods for performing lightness adjustment of a digital image which is independent of large area luminance averaging. This and other objects will become apparent in view of the following descriptions, drawings and claims.

SUMMARY OF THE INVENTION

A system and method for processing a digital image signal which represents an image can be made to optimally map luminance activity values versus a tonal reproduction capability of a destination application. Specifically, the system includes a device for partitioning the image into blocks, then combining certain blocks into sectors. An average luminance block value is determined for each block and a difference, i.e. a luminance activity, is determined between the maximum and minimum average luminance block values for each sector. If the difference exceeds a predetermined threshold value, then the sector is labeled as an active sector and an average luminance sector value is obtained from maximum and minimum average luminance block values. All active sectors of the image are plotted versus the average luminance sector values in a histogram, then the histogram is shifted via some predetermined criterion so that the average luminance sector values of interest will fall within a destination window corresponding to the tonal reproduction capability of a destination application.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
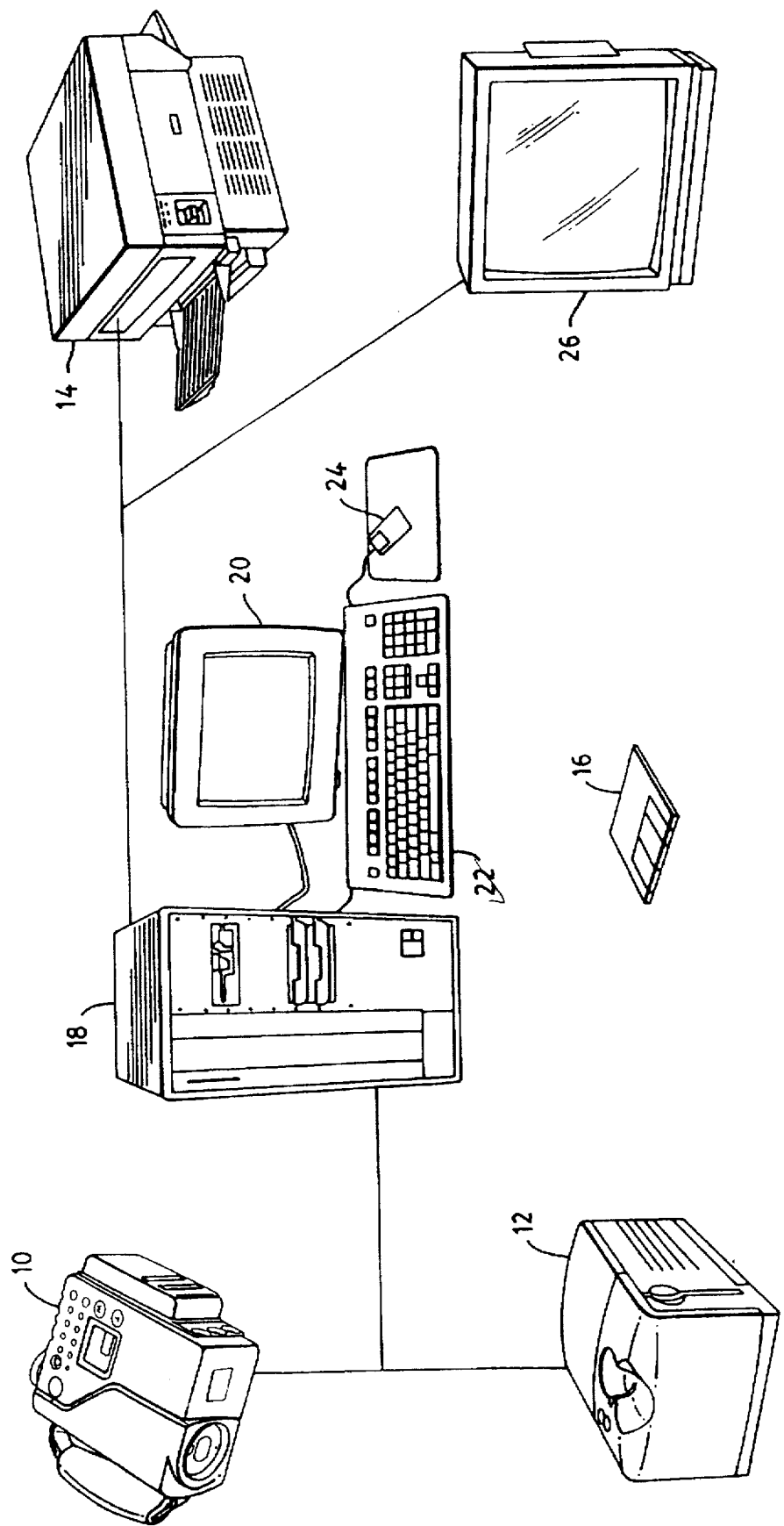
FIG. 1 shows an exemplary embodiment of the image processing system of the invention.

The present invention relates to an image processing system and associated image processing methods by which the luminance content in an original scene may be optimally matched with the tone reproduction capabilities of a destination application such as an electronic output display device, hardcopy printer, or photographic reproduction device. FIG. 1 illustrates one exemplary embodiment of such a system. As can be seen, FIG. 1 illustrates an electronic image processing system where an image signal source, such as an electronic still camera 10 or a scanner 12, provides an electronic image signal which represents an image of the subject (not shown). A computer 18 receives the electronic signal from the image signal source and thereafter processes the image signal electronically to provide any number of known image processing functions such as brightness adjustment. The processed image can be transmitted, i.e. output, to any destination device or destination application such as a diskette 16, an user monitor 20, a printer 14, or a remote monitor 26. Operator interaction with the system is facilitated by use of a keyboard 22 or a mouse 24. Of course, the components shown in FIG. 1 are merely exemplary rather than all inclusive of the many equivalent devices known by those skilled in the art. For instance, the image signal source could include any device which acts as an image signal source such as an electronic camera, a scanner, a camcorder, a charge coupled device, a charge injected device, etc. Also, it is noteworthy that the processing of the image need not necessarily occur solely in the computer 18. Indeed, various phases or aspects of the image processing could occur in the image signal source, the computer, or the destination output device.

Electronic image processing can occur in various domains such as the spatial domain or the frequency domain. An image is said to reside in the spatial domain when the values of parameters used to describe the image, such as brightness, have a direct correspondence with spatial location. Brightness of an image is defined as the attribute of sensation by which an observer is aware of differences in luminance. In the frequency domain, the image is represented as a matrix of frequency coefficients which are obtained by various transformation methods such as Fourier transformation, discrete cosine (DCT) transformation, etc.

One problem associated with known systems for brightness adjustment of a digital image is the lack of optimal exposure control. The simplest method of exposure control takes the overall luminance average of a scene and sets that average to coincide with the imaging system's reference gray value. This works well for scenes wherein the average luminance of the principal subject is the same as the overall average. However, this method is ineffective for difficult scenes which contain excessive backlighting or frontlighting, or which have specular reflectances which can unduly affect the overall average upon which the simple exposure meter is based. In the case of excessive backlighting, the brightness of the background is significantly higher than that of the subject of the scene, and in the case of excessive frontlighting, the background is much darker than the subject.

More sophisticated exposure control systems typically extend the above simple exposure method by using more complicated averaging schemes. One of the most common averaging methods for exposure control uses a center weighted luminance average, since the principal subject is often placed near the center of the picture. For this method, the highest weighting is applied a little below the geometrical center in order to reduce the influence of a bright sky, which might be in the background. Other known methods segment the scene into a pattern of central and peripheral areas and determine a control metric from some logical combination of the luminance averages of these areas. These refinements, though they represent a considerable improvement, are, when presented with a difficult scene, still subject to the errors pointed out above which are inherent in any method which depends upon large area luminance averaging.

Figure 2:
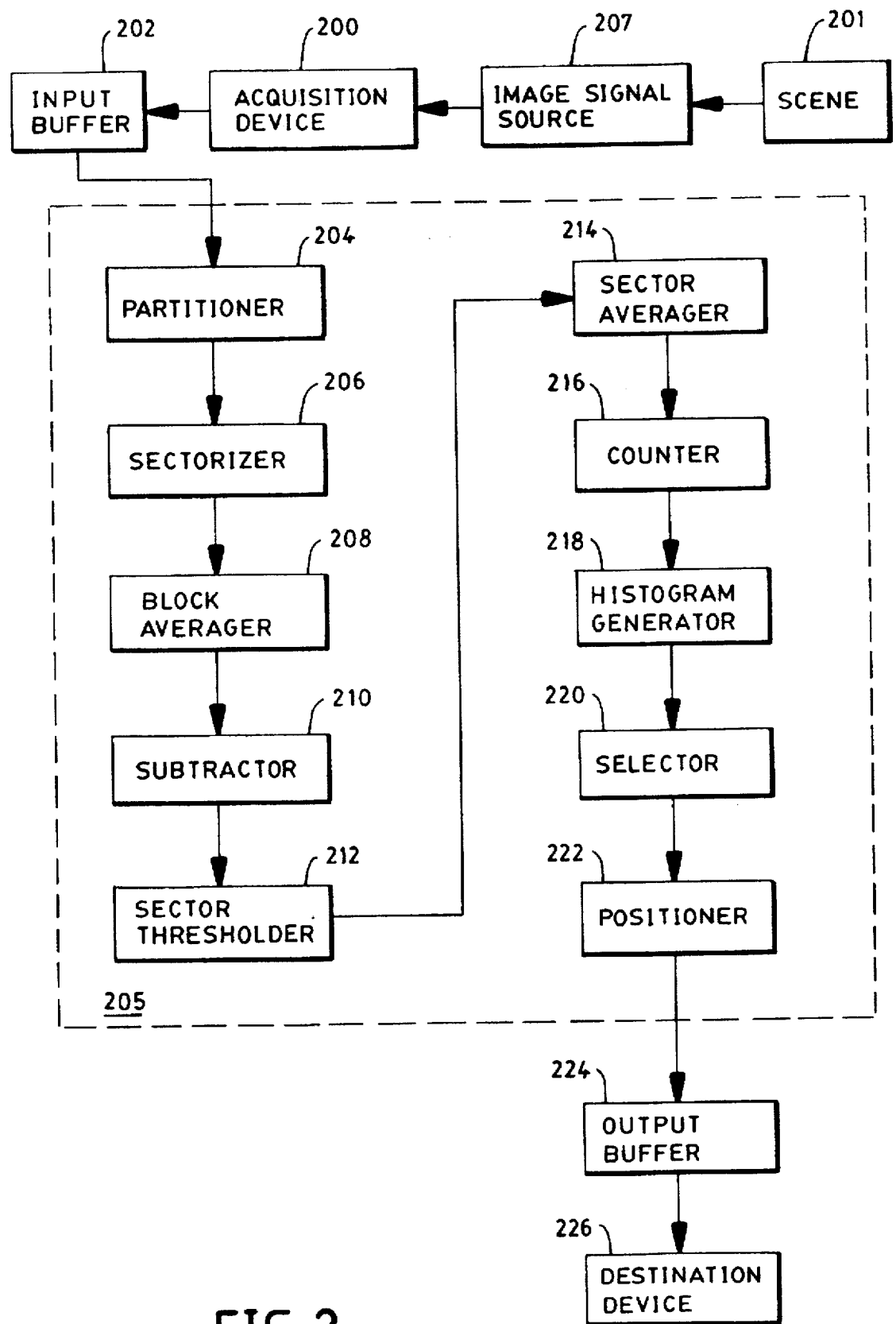
FIG. 2 is a block diagram of an image processing system according to the invention by which lightness adjustment of a digital image may be made.

FIG. 2 is a block diagram of the various elements of the image processing system for lightness adjustment of a digital image. It will be understood that each of the elements of the imaging processing system may be embodied, alternatively, as an on-board application specific integrated circuit (ASIC), field programmable gate array, other forms of firmware, resident on one or more of the components of the system of FIG. 1 or resident as an application program or program module in a general purpose computer such as that shown in FIG. 1. The scene 201 is represented as a digital image by image signal source 207, e.g. a camera, camcorder, charge-coupled device, charge-injected device, scanner, etc. The image acquisition device 200 acquires the image signal, which contains both luminance data and chrominance data characteristic of the image, and separates the luminance data which is thereafter stored in input buffer 202. The present invention analyzes only the luminance data and as such, the chrominance components will not be discussed any further.

Figure 3:
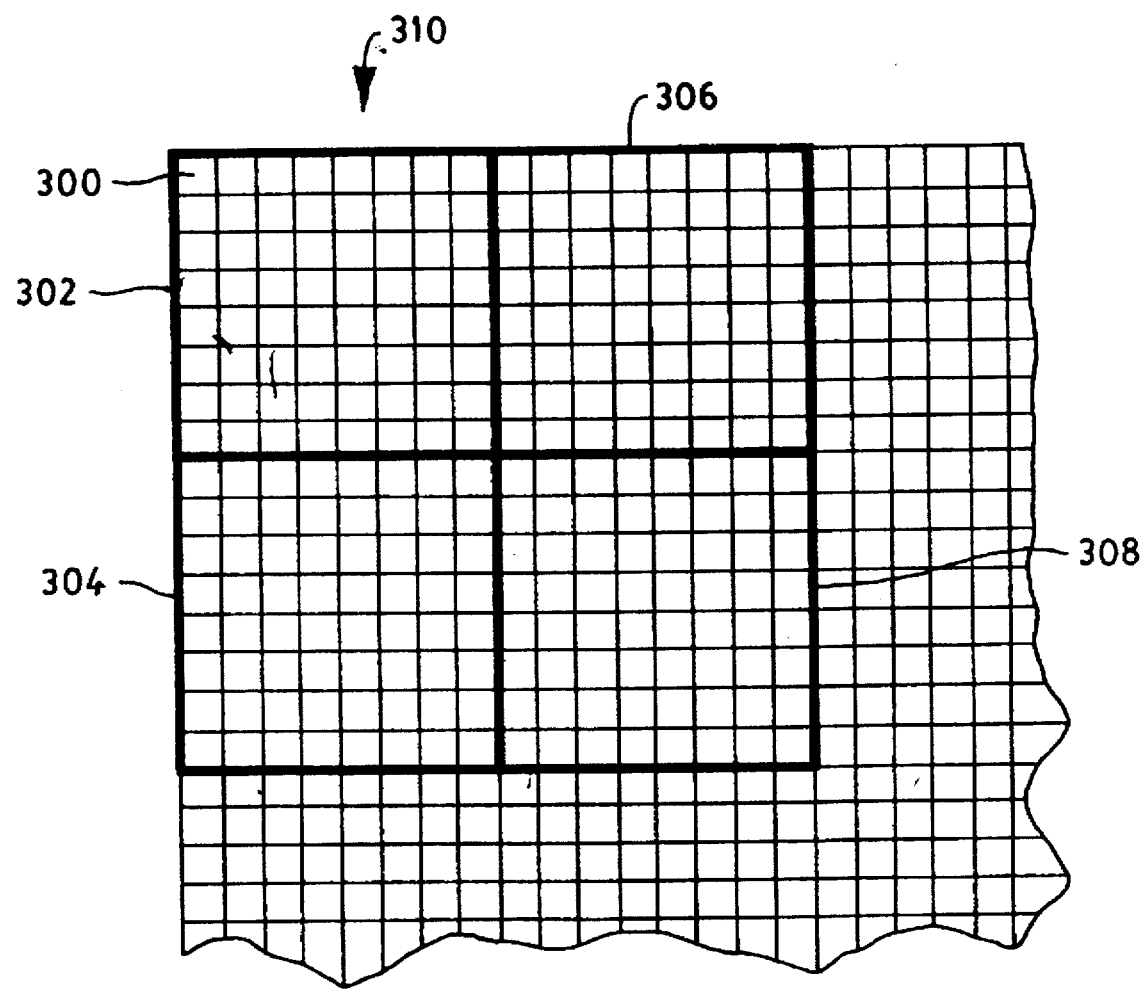
FIG. 3 is a magnified portion of an image showing individual pixels, 8×8 image blocks, and a 2×2 sector.

A portion of the image is represented in cutout in FIG. 3 as a composite of pixels 300 of luminance data. The signal processing circuitry 205 retrieves the luminance data from input buffer 202, processes the luminance data for lightness adjustment, then stores the processed data in output buffer 224. Eventually in a destination device 226, the processed data is used to reproduce the processed image in a destination application such as printing, displaying, transmission to a downstream application, or the like. The signal processing circuitry 205, as mentioned earlier, can be implemented as discrete hardware components as shown in FIG. 2, or the circuitry 205 could be emulated by a general purpose computer. And again, the hardware included in circuitry 205 could be completely or partially housed in other system elements such as the image signal generator 207, the image acquisition device 200, or the output device 226.

The signal processing circuitry 205 specifically includes a partitioner 204 which reads the luminance data from input buffer 202 and partitions the luminance data into a plurality of image blocks of predetermined size ranging from one to M×N pixels, where M is the number of rows and N is the number of columns in the image. In the preferred embodiment, the luminance data is segmented into 8×8 image blocks which conform to conventional block sizes for image processing as recommended, for instance, in Section 3.3 of the digital image compression standard 10918-1 of the International Standards Organization Joint Photographic Experts Group (ISO/JPEG). FIG. 3 demarcates four separate 8×8 image blocks 302, 304, 306 and 308. A sectorizer 206 combines a preselected group of the 8×8 image blocks into sectors which provides a lower resolution representation of the image than that of the pixel level. However, in the case when lowering the resolution of the pixels 300 is not desirable, the sectorizer 206 could be bypassed and for purposes of the processing to follow, each pixel 300 could be interpreted as a separate sector. In the preferred embodiment, sector 310 is defined as four 8×8 pixel adjacent image blocks combined into a single 2×2 sector. Block averager 208 then determines an average luminance block value for each image block in each sector. The average luminance block value can either be determined in the spatial domain by averaging each of the 64 pixels in each image block, or by transforming the luminance data of the pixels into discrete cosine transform (DCT) coefficients, then using the direct current element (0.0) of each 8×8 block of DCT coefficients as the average value for the image block. In a subtractor 210, the maximum and minimum average luminance block values are determined for each sector, then a difference is determined therebetween.

Figure 4A:
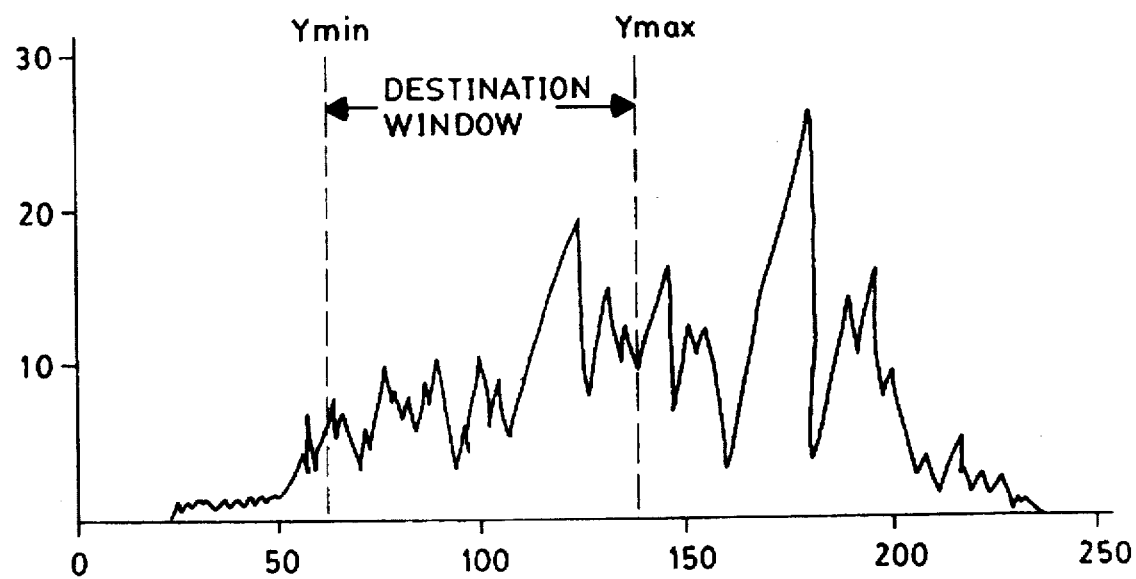
FIG. 4A is a histogram of the number of active sectors corresponding to average sector luminance values plotted along a logarithmic scale.
Figure 4B:
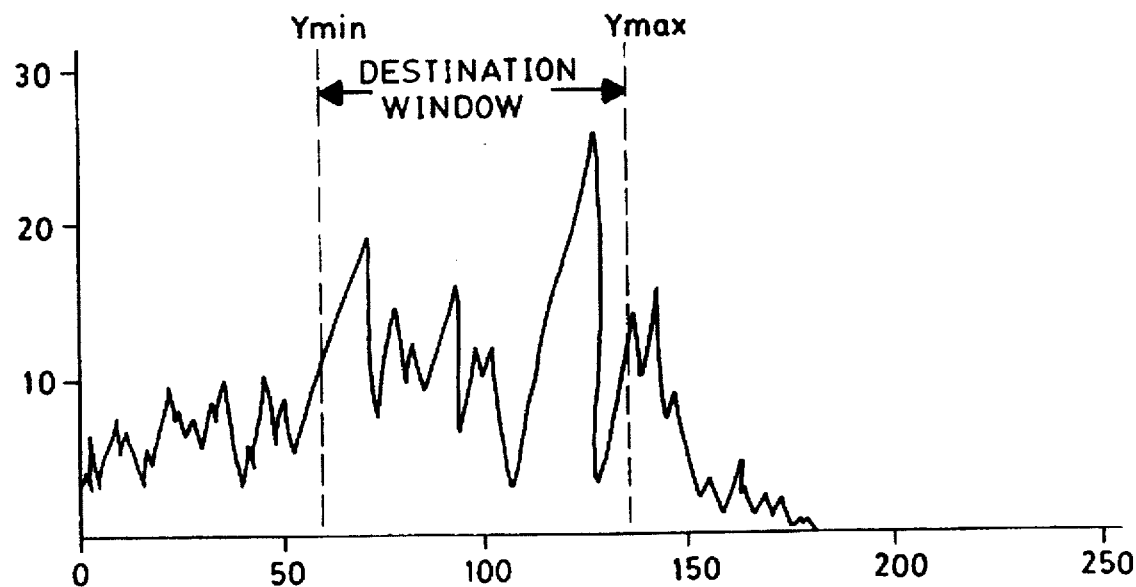
FIG. 4B is the histogram of FIG. 3A which has been remapped to target a desirable portion of the histogram into a specific tonal reproduction range.

A sector thresholder 212 compares the difference between the maximum and minimum average luminance block values for each sector with a predetermined threshold value and, when the difference is greater than the predetermined threshold value, then that sector is defined as an active sector. Once a sector is defined as an active sector, the maximum and minimum average luminance block values for that sector are averaged together to establish an average luminance sector value in a sector averager 214. Counter 216 counts the number of active sectors corresponding to each average luminance sector value, which typically ranges from 0 to 255 (white). Alternatively, the average luminance sector value of each active sector could be first weighted in sector averager 214, then counted in device 216, by any of a number of well-known weighting algorithms, so that the count of the number of active sectors would be altered accordingly. Once all the active sectors of the image have been weighted and counted, then a histogram such as the one shown in FIG. 4A is created by histogram generator 218. FIG. 4A shows the histogram where the number of active sectors is depicted along the vertical axis versus the average luminance sector values depicted along the horizontal axis. FIG. 4A also shows a destination window which represents the tone scale or tone reproduction capability corresponding to a destination application such as a printer, display, or other downstream application in the image processing chain of the invention. Here, the destination application is depicted as a destination output device 226. From FIG. 4A, it is clear that part of the luminance activity information (represented as active sectors of average luminance values) cannot be reproduced by the destination device 226, i.e., only the luminance data which falls within the destination window of the particular destination device will be reproduced. This problem is overcome in selector 220 by first providing a selection criterion for positioning the histogram of FIG. 4A. Then, a positioner 222 will maneuver the histogram of FIG. 4A so that desirable luminance activity information will fall within the established destination window in accordance with a selection criteria. For instance, FIG. 4B shows the histogram of FIG. 4A shifted so that the average luminance values corresponding to the highest occurrences of active sectors appear in the destination window. The various criteria for deciding how to shift or otherwise positioner the histogram in position 222 is predetermined according to a number of considerations which will be detailed further on in this application. The shifted luminance values of the histogram of FIG. 4B are stored in output buffer 224 and are thereafter printed, displayed or otherwise output to or by the destination device 226.

The approach of the present invention relies on scene analysis for solving various problems associated with the lightness adjustment of an image. It has been verified using psychovisual analysis whereby an experimental group of human observers compares a series of images of a common scene, each image varying only in brightness. Each observer selects the one image of the series which is most aesthetically pleasing. While the eyes sense a scene as a luminance bitmap, the content of the scene is ascertained by reading the visual information in the form of edges, textures and shadings. The quality of the image depends critically upon how well and to what extent this visual information is represented in the displayed image. Hypothetically, the optimal exposure should be the one which best preserves the visual information of the scene in easily readable form.

Each form of the above described visual information is represented according to changes in luminance, defined as the luminance activity. There are three parameters which define a luminance activity: (1) the magnitude of the luminance change between portions of an image; (2) the average luminance value over the area in which the luminance change occurs; and (3) the geometric distance over which the luminance change occurs.

The scene analysis method of the present invention is based on the observation that only the luminance content of a scene should be considered in making lightness adjustments where some detail of interest resides. Consequently, the overall strategy is to build sectors at the resolution of importance and then use a metric to interrogate those sectors for the presence of detail luminance activity. In particular, the scene analysis method of the present invention is based on a low resolution image derived from the average luminance of an image block. This low resolution image is divided into 2×2 luminance (for the preferred embodiment). Preferably, the size of the 2×2 sectors corresponds approximately to the peak resolution of the human visual system at the final image size. The magnitude of the sector activity is taken as $$Y_{mag} = Y_{max} - Y_{min}$$

where $Y_{max}$ and $Y_{min}$ are the maximum and minimum luminance sector values of the four blocks in a sector. The average luminance segment value for any given sector can be taken as $$Ave\ Y_{seg} = (Y_{max} + Y_{min})/2.$$

Since a luminance change which is not noticeable is not important, only luminance activities whose magnitudes exceed some predetermined threshold value are counted. Best empirical results have come using a threshold equivalent to about ⅓ of an F-stop or a density of about 0.1. This luminance activity metric is a non linear, omni directional 'detail' finder which has some sensitivity to all of the different types of information elements mentioned above, on a half wave scale of eight high resolution pixels. A histogram is formed by counting the number of over-threshold luminance activities as a function of the average luminance sector values. This luminance activity histogram shows image detail which is the basis of the analysis to estimate the optimal exposure. Large light or dark areas which contain no detail will not affect the results.

If the dynamic range of the luminance activity histogram is the same or smaller than that of the destination window representing the tonal reproduction range corresponding to the tonal reproduction capability of the destination application, then it is only necessary to reposition the histogram on a logarithmic luminance scale such that it fits within the destination window. The destination window useful for reproduction of an ideal film with a slope of 1.5 is about 4 stops, considerably smaller than the range of a typical luminance activity histogram, which can be up to 2 or 3 stops greater. Since there is generally a considerable overlap outside the destination window, some of the detail information is clipped and lost by the output limitations of the destination device.

The question of the optimal exposure shift is one of positioning the histogram over the destination window to get the best result, recognizing that the information represented by the ends of the histogram which extend beyond the print window may be lost. The best or desired results are, of course, dependent upon the specific application requirements.

An example of an image histogram based on activity luminance is shown in FIG. 4A. The luminance scale is in logarithmic units to the base 2 with 20 units per F stop. The vertical dotted lines represent the limits of the destination window. Numerous parameters for positioning the histogram into the destination window are possible in accordance with the specific application requirements. The following four exemplary parameters have been tested.

MidShift: Set the midpoint of the histogram range to the midpoint of the destination window.

MeanShift: Determine the weighted mean of the activity luminance, using the activity counts as weights and set the weighted mean to the midpoint of the destination window.

MaxShift: Shift the histogram on the log luminance scale such that the maximum possible number of counts are included in the destination window.

EqEndShift: Shift the histogram such that the same number of counts are excluded from the destination window at either end of the histogram.

These four parameters differ in their sensitivity to the range, the shape and the symmetry of the histogram. The best test results of any one of the above parameters occurred with the EqEndShift. Somewhat better results were obtained by either averaging all four of the above parameters, or by averaging the MidShift, the MeanShift, and the EqEndShift.

Testing of the above parameters was accommodated with a digital image library of 594 digital images of a wide variety of scenes including an oversampling of difficult scenes, e.g. snow scenes, beach and water scenes, high contrast back-lit and side-lit scenes, etc. Each image was obtained by photographing a scene using Kodak VPS color negative film and scanning the processed negative with a high resolution Itek scanner. The scanner was calibrated to world XYZ space using a set of known color reference patches over a broad exposure range. This calibration enables printing of the scanned digital images on a similarly calibrated high quality color printer.

Each image was subjected to psychovisual testing with a panel of 25 people who selected a preferred exposure from a series of prints of the same scene made at eight equallyspaced levels of brightness. This provided the "psychovisual best" exposure data for comparing estimates of the best exposure from the scene analysis exposure method. The differences between the scene analysis estimates and the corresponding psychovisual best exposures were determined for each of the 594 images. The results were determined using the standard deviation of these differences. Some of the results are summarized below.

| Results of Scene Analysis<br>Values are log Exposure, 20 units per F stop | | |
|---|---|---|
| | Std. Dev. | Max. Error |
| Center Weight | 13.7 | 53 |
| MidShift | 12.5 | 51 |
| MeanShift | 11.3 | 34 |
| MaxShift | 11.3 | 42 |
| EqEndShift | 10.3 | 35 |
| EqEndMeanMidAve | 10.1 | 30 |
| AllAve | 10.1 | 31 |

The above results include center weighting and cutoff procedures to be later described. The first entry is the result of a weighted luminance average. The last two entries are the result of averaging the exposure estimates from three, or all four of the scene analysis histogram evaluation methods.

Almost any method of adjusting exposure—even a good guess based upon prior experience and personal judgment—can give quite acceptable results for a majority of scenes, since the most common scenes tend to contain a well distributed set of brightness values. Improvements in exposure control reduce the variability in the common, easy scenes and bring a greater range of difficult scenes into the acceptable and higher quality categories. The scene analysis method reduced the maximum error in the tested images for the center-weighted average from over 2.5 stops to just 1.5 stops while making a 30% reduction in the standard deviation of the exposure error.

Additional improvements or modifications of the above described basic scene analysis can give modest improvement in the overall results. These new factors, listed below, are described in the following sections.

1. Center weighting of over-threshold luminance activity counts
2. High luminance cutoff
3. Multiple correlation of errors using shift invariant image parameters
4. Adaptive luminance activity threshold
5. Scene adaptive contrast adjustment based on luminance activity Center Weighting Almost all camera exposure control mechanisms use some sort of center weighting. This approach takes advantage of the general tendency to place the principal subject near the center of the frame when taking a picture. Many automatic cameras use an exposure meter covered by an asymmetric lens which produces a slightly off center weighted response.

To use center weighting in the above scene analysis procedure, the histogram is built by adding up the position dependent weights for the active sectors (instead of simply counting them) associated with a given average luminance sector value. Several weighting matrices have been tested, with the best results coming from the following weighting matrix of the exposure meter used in one automatic camera.

| Weighting Matrix in Percentages | | | | | | | | | | | | | | | | | | | | | | |
|---|---|---|---|---|---|---|---|---|---|---|---|---|---|---|---|---|---|---|---|---|---|---|
| 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| 10 | 10 | 10 | 25 | 25 | 25 | 25 | 25 | 25 | 25 | 25 | 25 | 25 | 25 | 25 | 25 | 25 | 25 | 25 | 25 | 10 | 10 | 10 |
| 10 | 10 | 10 | 25 | 25 | 25 | 25 | 25 | 25 | 25 | 25 | 25 | 25 | 25 | 25 | 25 | 25 | 25 | 25 | 25 | 10 | 10 | 10 |
| 10 | 10 | 10 | 25 | 25 | 25 | 25 | 25 | 25 | 25 | 25 | 25 | 25 | 25 | 25 | 25 | 25 | 25 | 25 | 25 | 10 | 10 | 10 |
| 10 | 10 | 10 | 25 | 25 | 25 | 50 | 50 | 50 | 50 | 50 | 50 | 50 | 50 | 50 | 50 | 50 | 25 | 25 | 25 | 10 | 10 | 10 |
| 10 | 10 | 10 | 25 | 25 | 25 | 50 | 75 | 75 | 75 | 75 | 75 | 75 | 75 | 75 | 75 | 50 | 25 | 25 | 25 | 10 | 10 | 10 |
| 10 | 10 | 10 | 25 | 25 | 25 | 50 | 75 | 75 | 75 | 75 | 75 | 75 | 75 | 75 | 75 | 50 | 25 | 25 | 25 | 10 | 10 | 10 |
| 10 | 10 | 10 | 25 | 25 | 25 | 50 | 75 | 75 | 90 | 90 | 90 | 90 | 90 | 75 | 75 | 50 | 25 | 25 | 25 | 10 | 10 | 10 |
| 10 | 10 | 10 | 25 | 25 | 25 | 50 | 75 | 75 | 90 | 90 | 90 | 90 | 90 | 75 | 75 | 50 | 25 | 25 | 25 | 10 | 10 | 10 |
| 10 | 10 | 10 | 25 | 25 | 25 | 50 | 75 | 75 | 90 | 90 | 100 | 90 | 90 | 75 | 75 | 50 | 25 | 25 | 25 | 10 | 10 | 10 |
| 10 | 10 | 10 | 25 | 25 | 25 | 50 | 75 | 75 | 90 | 90 | 90 | 90 | 90 | 75 | 75 | 50 | 25 | 25 | 25 | 10 | 10 | 10 |
| 10 | 10 | 10 | 25 | 25 | 25 | 50 | 75 | 75 | 90 | 90 | 90 | 90 | 90 | 75 | 75 | 50 | 25 | 25 | 25 | 10 | 10 | 10 |
| 10 | 10 | 10 | 25 | 25 | 25 | 50 | 75 | 75 | 75 | 75 | 75 | 75 | 75 | 75 | 75 | 50 | 25 | 25 | 25 | 10 | 10 | 10 |
| 10 | 10 | 10 | 25 | 25 | 25 | 50 | 75 | 75 | 75 | 75 | 75 | 75 | 75 | 75 | 75 | 50 | 25 | 25 | 25 | 10 | 10 | 10 |
| 10 | 10 | 10 | 25 | 25 | 25 | 50 | 50 | 50 | 50 | 50 | 50 | 50 | 50 | 50 | 50 | 50 | 25 | 25 | 25 | 10 | 10 | 10 |
| 10 | 10 | 10 | 25 | 25 | 25 | 25 | 25 | 25 | 25 | 25 | 25 | 25 | 25 | 25 | 25 | 25 | 25 | 25 | 25 | 10 | 10 | 10 |
| 10 | 10 | 10 | 25 | 25 | 25 | 25 | 25 | 25 | 25 | 25 | 25 | 25 | 25 | 25 | 25 | 25 | 25 | 25 | 25 | 10 | 10 | 10 |

This 19×23 matrix gives maximum weight of 100% to cell (12, 12), centered laterally but about ⅝ of the distance down from the top of the matrix. The weights fall off in a more or less Gaussian ellipse to ten percent at the edges for this particular weighting matrix. In practice this weighting matrix is interpolated to both the aspect ratio and the resolution of the sector image of the scene to be analyzed. Results using this procedure show a modest improvement of about 4% in the standard deviation of the scene analysis exposure error.

Luminance Cutoff

Very high contrast scenes often contain specular reflections from waves, ice crystals, etc., which produce over-threshold activities that add to the high luminance end of the histogram and tend to make the resultant image too dark. Attempts to avoid this phenomenon have been made by establishing a luminance limit beyond which the histogram values are set to zero, i.e., active sectors where average luminance sector values above this limit are not considered in the analysis. The luminance limit, $Y_{lim}$, for a given scene is given as follows:

if $Y_{max}-Y_{min}>$Cutoff then $Y_{lim}=Y_{min}-1+$Cutoff else $Y_{lim}=Y_{max}$ where $Y_{max}$ and $Y_{min}$ are, respectively, the maximum and minimum average luminance sector values in the scene and Cutoff is the upper limit of the dynamic range. The optimum value for Cutoff was determined by experiment, using the 594 images from the image database, to be 7.5 stops. Incorporating the luminance cutoff procedure into the scene analysis reduced the standard deviation of the overall exposure error by just 1% (since it affects only a few of the highest contrast images), but reduced the maximum too dark error by 10%.

Multiple Correlation of Errors

A main object of scene analysis is basically to predict the luminance shift which will produce a print at the same lightness level that was chosen by the psychovisual testing panel as the psychovisual best for any given image.

TrueShift=SA_Shift+Error

TrueShift is the psychovisual best and SA_Shift is the scene analysis result. The success of the scene analysis algorithm is characterized by the standard deviation of the error.

If image parameters could be established with respect to which the errors are not completely random, then TrueShift=SA_Shift+f(Parameters)+ReducedError wherein f(Parameters) represents a function of image parameters which correlates out some of the error variability. The correlating parameters are selected cautiously to assure that the result will remain independent of the starting point. A parameter, such as $Y_{max}$ or $Y_{min}$, which is related to an absolute luminance value in the original scene, will introduce implicit knowledge of the correct answer into the correlation process and give excellent results which, however, are spurious and have no general predictive value. Valid correlating parameters must themselves be shift invariant, i.e. relating to luminance differences.

The correlation tendencies of each of the following invariant parameters was tested.

| | |
|---|---|
| ActAve0 | The average of all unthresholded luminance activity values |
| MeanMMid | HistoMean − HistoMid |
| MeanMMidSq | MeanMMid$^2$ |
| LumBal | $\frac{(HistoMax - HistoMean) - (HistoMean - HistoMin)}{HistoRange}$ |
| LumBalSq | LumBal$^2$ |
| Yrange | Overall Luminance dynamic range ($Y_{max}-Y_{min}$) of the histogram |
| Range_Ratio | HistoRange/DestinationWindowWidth |

In the above definitions, HistoMax is the maximum luminance for which the histogram value is non-zero, HistoMin is the corresponding minimum luminance, HistoRange is HistoMax−HistoMin, HistoMean is the weighted mean luminance of the histogram, HistoMid is the midpoint value of the histogram, and LumBal is the luminance balance.

The following equation represents the overall multiple correlation of the scene analysis errors.

Error=−1.07ActAve0−0.41LumBal+0.004LumBalSq+0.61MeanMMid

The other variables listed above but not included in the above equation did not test out as significant at the 0.05 level. The significance levels from the equation of the variables ActAve0, LumBal, LumBalSq, and MeanMMid were, respectively, 0.0001, 0.0018, 0.00018, and 0.0057.

The standard deviation of the remaining error was improved by about 5%, and the correlation coefficient was 11% whereby the correlation can account for 11% of the error variability. This represents a modest improvement, but it is so weak that it may be fortuitous.

Experiments have also been tried for grouping the data according to a variable such as Range_Ratio or LumBal and then doing a multiple correlation within each group. This gives a little better result (up to about 8% improvement in the standard deviation of the overall error) but has the disadvantage that the number of data points in each group is smaller, leading to concerns about the general applicability of the correlations to new images not in the experimental database. The application of multiple correlation of errors could thus be useful in applications where the characteristics of a photographic space of interest are well defined, and there is a statistically valid representative sample of the workable photographic space, e.g., application to identification photos, industrial documentation photos, etc.

Adaptive Luminance Activity Threshold

The human visual system has a nonlinear response to differences in luminance expressed by the relation $$L^* = 116(Y/Y_n) - 16$$

where Y is luminance, $Y_n$ is the reference luminance illuminating the scene, and L* is a lightness measure in L*a*b* space in which differences bear a linear relation to human perceptual response. It makes sense theoretically to define the luminance activity threshold in terms of L* rather than the usual log luminance scale, because the perceptible detail in the image is sought. A given threshold value encompasses considerably fewer L* steps in darker regions than in lighter ones—by about a factor of 3 when going from about 5% to 90% reflectance, allowing discrimination of smaller luminance increments at higher luminance levels. It should, therefore, be better to use a smaller luminance increment as the threshold for counting activities as a function of increasing sector luminance in such a way as to keep the L* increment constant. An outline of the procedure to convert a given L* increment to the corresponding log(Y) increment follows.

1. Assume a digital log space in which the digital value (y) is defined by $$y = dps * \log 2(Y) + yn$$

Here dps is the number of digits per stop, log2(Y) represents the logarithm base 2 of linear space luminance, and yn is the digital value on the chosen scale corresponding to 100% reflectance when Y=1.

2. Convert the reference y (yref), the value at the center of the equivalent delta y to be calculated, to the L* scale (Lref).

$$Lref = (116) 2^{((yref-yn)/(3dps))} - 16$$

3. Determine the delta y (ydelta) equivalent to a given delta L* (Ldelta) by $$x = Ldelta/(2(Lref+16))$$

$$ydelta = (6dps/\ln(2)) \text{ arcsinh}(x)$$

wherein ln (2) is the natural logarithm of 2.

Using an eight bit log2 scale with dps=20 and yn=160, the following equivalent increments in y are found for a desired increment of 4 units in L* (with Ldelta=4)

| y | ydelta | % Reflectance |
|---|---|---|
| 73 | 8 | 8 |
| 112 | 5 | 18 |
| 157 | 2.5 | 90 |

In order to use an L* increment as a luminance activity threshold in the scene analysis, a lookup table is established expressing the above ydelta versus y relation and use of the ydelta value for the luminance activity as the threshold for testing the luminance activity of a sector. Since the ydelta values are appropriate only for a correctly exposed scene and since, in general, the original digital image may be off by some arbitrary amount, a preliminary estimate of the exposure shift must be made. This is accomplished by determining the shift necessary to bring $Y_{lim}$, previously defined in the Luminance Cutoff section, to coincide with yn, which is the white point for 100% reflection.

After testing several L* increments as luminance activity thresholds, it was found that Ldelta=4 gave statistical results which were virtually identical to those obtained by the standard system using a constant threshold value of 0.3 stop.

Scene Adaptive Contrast Adjustment

Up until now the object of scene analysis has been to determine a lightness shift necessary to achieve a high quality display of the image. If the scene has a dynamic range greater than the destination window (which is the case more often than not), this means that even if the principal subject is properly exposed the brighter and darker areas of the image will be clipped in the display, i.e., bright objects will be washed out and deep shadows will be blocked up. A strongly backlit background, for example, can completely disappear.

Using the luminance activity based histogram, clipping of important information can be avoided by adjusting the scene contrast such that the entire histogram fits within the destination window. This means that the tone scale of a high contrast image is compressed.

The concept of tone scale adjustment is not new. It is common, particularly in video photography, to adjust the signal such that the overall dynamic range of the scene fills up the dynamic range of the display. But there is a distinct advantage to using the luminance activity based histogram as the basis of the contrast adjustment in that the entire luminance range is not necessarily included, but just the range necessary to include the perceptible detail. Overbright or overdark areas that contain no detail (and so are thus not very interesting anyway) will have no influence. This minimizes the degree of contrast adjustment necessary.

This concept has been implemented in the simplest possible way. For each luminance value y in the image, a new value yadj is calculated as $$yadj = (y - ymid)/\text{RangeRatio} + ymid,$$

where ymid represents the midpoint of the histogram. This is a simple linear adjustment which brings the histogram limits to be the same size as the destination window. At that point, the image is shifted to bring the histogram into coincidence with the destination window. One can think of other ways to do the contrast adjustment. There might be advantages to an asymmetric adjustment, for instance, in which different factors would be applied to the brighter and darker portions with the fixed point at print L*=50 (mid-gray) or print L*=60 (where illuminated flesh tones tend to appear) instead of at ymid. This would be particularly effective if very good exposure accuracy could be attained.

The danger of making large contrast reduction adjustments is that the image can take on a flat appearance, lacking punch. This is due to the reduction in sharpness and color saturation which accompany the effectively lower contrast. However, measures to compensate for these problems in image processing steps extraneous to scene analysis per se include the following:

1. Using a tone scale in the final destination application color map which is similar to the usual ideal film but which has a sharper toe and shoulder. This increases the effective dynamic range and so reduces the magnitude of the necessary contrast adjustment.
2. Using contrast adaptive sharpening. That is, sharpening more in proportion to the magnitude of the contract reduction.
3. Combining scene analysis with a burning and dodging procedure for local brightness adjustment. Scene analysis is done twice—first using the standard algorithm, then the resulting image is passed through the burning and dodging procedure, and finally the contrast adaptive scene analysis is used on that result to produce the final result. Since burning and dodging reduces local contrast, for some images the global contrast reduction in the second scene analysis step can be less. Both burning and dodging and global contrast adjustment can bring in overexposed or underexposed foregrounds and backgrounds. They seem to be synergistic when used together.

One burning and dodging procedure for local brightness adjustment is implemented in the positioner 222 of FIG. 2 by moving all the active luminance sectors of interest that fall outside of the destination window in the histogram of FIG. 4A to the nearest histogram limit Ymax or Ymin. In other words, any luminance values of interest with an average luminance sector value less than Ymin is moved to Ymin, and any luminance values of interest with any average luminance sector value greater than Ymax is moved to Ymax.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A system for processing a digital image signal representing an image, said image containing both luminance data and chrominance data, to map the luminance data to a tonal reproduction capability of a destination application, said system comprising:

means for acquiring the image signal and separating the luminance data from the image signal;

an input buffer for storing said luminance data;

means for reading and partitioning said luminance data from said input buffer into a plurality of image blocks of predetermined size;

means for determining an average luminance block value for each said image block;

means for selectively combining preselected ones of said image blocks of said luminance data into sectors;

means for determining a difference between a maximum said average luminance block value and a minimum said average luminance block value of each sector, and comparing said difference with a predetermined threshold value;

means for identifying an active sector as one where said difference exceeds said predetermined threshold value;

means for determining an average luminance sector value for each active sector as an average of the maximum and minimum average luminance block values of each sector;

means for weighting and counting a number of active sectors corresponding to each said average luminance sector value;

means for generating a histogram of said number of active sectors versus said average luminance sector values;

means for selecting a tonal reproduction range corresponding to the tonal reproduction capability of the destination application; and means for mapping said average luminance sector values into said tonal reproduction range of said destination application and generating a digital output signal corresponding to said mapping.

2. The image processing system of claim 1 wherein the means for selecting a tonal reproduction range is selected from the group consisting of:

means for determining a midshift by setting a midpoint of a range of the histogram to a midpoint of the tonal reproduction capability of the destination application;

means for determining a meanshift by providing a weighted mean of the average luminance sector values within the tonal reproduction range using the number of active sectors as weights, then setting the weighted mean to the midpoint of the tonal reproduction capability of the destination application;

means for determining a maxshift by maximizing the number of active sectors within the tonal reproduction capability of the destination application;

means for determining an eqendshift by shifting the histogram so that an equal number of active sectors are excluded from the tonal reproduction capability of the destination application at either end of the histogram;

means for determining an average of the midshift, meanshift and eqendshift; and means for determining an average of the midshift, meanshift, maxshift and eqendshift.

3. An image processing method for processing a digital image signal representing an image, said image containing both luminance data and chrominance data, to optimally map the luminance data to a tonal reproduction capability of a destination application, said method comprising the steps of:

acquiring the image signal and separating the luminance data from the image signal;

storing said luminance data in an input buffer;

reading and partitioning said luminance data from said input buffer into a plurality of image blocks of predetermined size;

determining an average luminance block value for each said image block;

combining preselected ones of said image blocks of said luminance data into sectors;

determining a difference between a maximum said average luminance block value and a minimum said average luminance block value of each sector, and comparing said difference with a predetermined threshold value;

identifying an active sector as one where said difference exceeds said predetermined threshold value;

determining an average luminance sector value for each active sector as an average of the maximum and minimum average luminance block values of each sector;

weighting and counting a number of active sectors corresponding to each said average luminance sector value;

generating a histogram of said number of active sectors versus said average luminance sector values;

selecting a tonal reproduction range corresponding to the tonal reproduction capability of the destination application; and mapping said average luminance sector values into said tonal reproduction range of said destination application and generating a digital output signal corresponding to said mapping.

4. The image processing method of claim 3, wherein the tonal reproduction range is selected from the group consisting of:

providing a midshift by setting a midpoint of a range of the histogram to a midpoint of the tonal reproduction capability of the destination application;

providing a meanshift by determining a weighted mean of the average luminance sector values within the tonal reproduction capability of the destination application using the number of active sectors as weights, then setting the weighted mean to the midpoint of the tonal reproduction capability;

providing a maxshift by maximizing the number of active sectors within the tonal reproduction capability;

providing an eqendshift by shifting the histogram so that an equal number of active sectors are excluded from the tonal reproduction capability of the destination application at either end of the histogram;

providing an average of the midshift, meanshift and eqendshift; and providing an average of the midshift, meanshift, maxshift and eqendshift.

5. The system of claim 1 wherein said predetermined block size comprises one pixel.

6. The system of claim 1 wherein said predetermined block size comprises 8×8 pixels.

7. The system of claim 1 wherein a sector size corresponds approximately to the maximum resolution of the human visual system.

8. The method of claim 3 wherein said predetermined block size comprises one pixel.

9. The method of claim 3 wherein said predetermined block size comprises 8×8 pixels.

10. The method of claim 3 wherein a sector size corresponds approximately to the maximum resolution of the human visual system.

11. The image processing system of claim 1, wherein the means for selecting a tonal reproduction range comprises means for generating adjusted data from said luminance data by subtracting a midpoint luminance value from said luminance data to produce a difference, determining a RangeRatio by dividing a range of said histogram by a width of a destination window, dividing the difference by the RangeRatio to generate a quotient, and adding the midpoint luminance value to the quotient, and wherein the means for mapping comprises means for shifting said adjusted data to coincide with said destination window and means for generating the digital output signal corresponding to said shifted adjusted data.

12. The image processing method of claim 3, wherein the step of selecting a tonal reproduction range is facilitated by generating adjusted data from said luminance data by subtracting a midpoint luminance value from said luminance data to produce a difference, determining a RangeRatio by dividing a range of said histogram by a width of a destination window, dividing the difference by the RangeRatio to generate a quotient, and adding the midpoint luminance value to the quotient, and wherein the step of mapping is facilitated by shifting said adjusted data to coincide with said destination window and generating the digital output signal corresponding to said shifted adjusted data.

13. A method for processing a digital input image and exporting the processed image to a downstream application having a given tonal reproduction range, said method comprising the steps of:

partitioning the input image into sectors of predetermined size;

determining for each said sector a luminance activity defined as a difference in luminance between at least two pixels within each said sector;

generating an average luminance value for each said sector having said luminance activity greater than a predetermined threshold value;

generating a count of sectors having each said average luminance value;

mapping said average luminance values, having counts falling within a predetermined selection criterion, into the tonal reproduction range; and exporting the processed image to the downstream application in response to said mapped luminance values.

14. The method of claim 13, wherein said predetermined selection criterion is selected from the group consisting of:

(A) setting a midpoint of a range of said average luminance values to a midpoint of the tonal reproduction range;

(B) determining a weighted mean of said average luminance values, then setting said weighted mean to said midpoint of the tonal reproduction range;

(C) maximizing said average luminance values within the tonal reproduction range;

(D) excluding an equal number of low end and high end average luminance values from the tonal reproduction range;

(E) providing an average of (A), (B) and (C); and (F) providing an average of (A), (B), (C) and (D).

15. A system for processing a digital input image and exporting the processed image to a destination application having a given tonal reproduction range, said system comprising:

means for partitioning the input image into sectors of predetermined size;

means for determining for each said sector a luminance activity defined as a difference in luminance between at least two pixels within each said sector;

means for generating an average luminance value for each said sector having said luminance activity greater than a predetermined threshold value;

means for generating a count of sectors having each said average luminance value;

means for mapping said average luminance values, having counts falling within a predetermined selection criterion, into the tonal reproduction range; and means for exporting the processed image on the destination application in response to said mapped luminance values.

16. The system of claim 15, wherein said predetermined selection criterion is selected from the group consisting of:

(A) setting a midpoint of a range of said average luminance values to a midpoint of the tonal reproduction range;

(B) determining a weighted mean of said average luminance values, then setting said weighted mean to said midpoint of the tonal reproduction range;

(C) maximizing said average luminance values within the tonal reproduction range;

(D) excluding an equal number of low end and high end average luminance values from the tonal reproduction range;

(E) providing an average of (A), (B) and (C); and (F) providing an average of (A), (B), (C) and (D).

* * * * *